(12) United States Patent
Akiyama et al.

(10) Patent No.: US 6,597,343 B1
(45) Date of Patent: Jul. 22, 2003

(54) KEYBOARD DEVICE HAVING TERMINAL CONNECTABLE TO PERIPHERAL DEVICE

(75) Inventors: Naoya Akiyama, Fukushima-ken (JP); Naoyuki Hatano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 256 days.

(21) Appl. No.: 09/587,420

(22) Filed: Jun. 1, 2000

(30) Foreign Application Priority Data

Jun. 1, 1999 (JP) .......................................... 11-154338

(51) Int. Cl.[7] .................................................. G09G 5/00
(52) U.S. Cl. ........................ 345/168; 345/167; 341/20; 341/21; 341/22; 341/26; 341/34
(58) Field of Search ................................. 345/168, 167; 341/20, 22, 26, 21, 34; 200/305

(56) References Cited

U.S. PATENT DOCUMENTS 5,401,926 A * 3/1995 Aoyama et al. ............... 341/22
5,557,299 A * 9/1996 Maynard et al. ............ 345/168
5,734,550 A   3/1998 Penniman et al. .......... 361/687
5,877,709 A * 3/1999 Ala-Lehtimaki et al. ...... 341/26
5,953,206 A * 9/1999 Jondrow ..................... 361/687
6,307,538 B1 * 10/2001 Bacon ........................ 345/168

* cited by examiner

*Primary Examiner*—Richard Hjerpe
*Assistant Examiner*—Ali Zamani
(74) *Attorney, Agent, or Firm*—Brinks Hofer Gilson & Lione

(57) ABSTRACT

A USB-compliant keyboard device is provided that is capable of preventing malfunctions, operation failure and the like due to static noise by a simple method. The keyboard device has a keyboard main body with a large number of key tops on its upper surface, an upper case and a lower case accommodating the keyboard main body, a control circuit board on which a control circuit to control the keyboard main body is mounted, and USB connectors connected to the control circuit board. Further, a shield plate covering the control circuit board from a lower position is provided. The shield plate is electrically connected to frame ground members of the USB connectors and a shield line of a cable connected to a personal computer main body.

3 Claims, 3 Drawing Sheets

KEYBOARD DEVICE HAVING TERMINAL CONNECTABLE TO PERIPHERAL DEVICE

BACKGROUND OF THE INVENTION

1. Field of the Invention

The present invention relates to a keyboard device, and more particularly, to a keyboard device having terminals connectable to peripheral devices other than a computer main body.

2. Description of the Related Art

Conventionally, personal computers and their peripheral devices have been developed for the purpose of reduction of manufacturing cost and simplification of configuration. Especially, a keyboard device, connected as an input device to a personal computer main body, has a keyboard main body with a large number of key switches, a case accommodating the keyboard main body in a state where the key tops on the key switches are exposed, and a circuit board, included in the case, having a control circuit to control electric signals transferred between the keyboard main body and the personal computer main body. As the large number of parts of the keyboard device are manufactured and assembled at a high cost, cost reduction measures are always required.

In recent years, a keyboard device, connected to a personal computer main body, which further has terminals commonly connectable to various peripheral devices such as a mouse, has been provided. In the conventional system, generally, peripheral devices such as a keyboard, a mouse and a printer are respectively connected to specialized ports for the respective peripheral devices of the personal computer main body. On the other hand, in the system having the above keyboard device, the keyboard device is connected to the personal computer main body, and peripheral devices such as a mouse and a printer can be connected to peripheral-device common connection terminals provided in the keyboard device. For such connection, a connector in which a plug of the peripheral device is inserted is provided on a control circuit board in the keyboard device. The formats of the plug, connector and the like for this sort of connection are standardized as USB standards, and attract attention as USB-compliant peripheral devices.

In use of personal computer, input devices such as a keyboard and a mouse are always manipulated by a user, and build up a large amount of static electricity. The electrostatic buildup occasionally causes electric discharge adversely affecting, as noise, various signals transferred between the personal computer main body and the input devices.

Different from the conventional system where the input devices are connected to the specialized ports of the personal computer main body in parallel, in the above USB-compliant system, if the mouse is connected on the downstream side of the keyboard, as well as a data signal from the mouse, an address signal, for recognition of the presence of downstream input device i.e. the mouse by the personal computer main body, is always transmitted inside the keyboard. In the conventional system, even if static noise enters and causes abnormality in data signals, normal operation can be restored without any particular problem after reset and retransmission of data. However, in case of the USB-compliant system, upon entrance of noise, if the address signal of the mouse is reset, the personal computer main body cannot recognize the presence of the mouse regardless of connection of the mouse downstream of the keyboard. In this case, there is a possibility that the operation by using the mouse cannot be made. From this situation, especially in a USB-compliant keyboard, improved static-noise resistance is required, and antistatic measures are urgent matters.

Further, upon prescription of static-noise countermeasures, to avoid an increase in the manufacturing cost of the keyboard device, it is desirable to take measures against static noise by a method as simple as possible without high cost.

SUMMARY OF THE INVENTION

The present invention has been made to solve the above problem and has its object to provide a USB-compliant keyboard device capable of preventing malfunction and operation failure due to static noise by a simple method.

According to one aspect of the present invention, the foregoing object is attained by providing a keyboard device comprising: a keyboard main body having plural key tops on its upper surface; a case accommodating the keyboard main body; a control circuit board on which a control circuit that controls the keyboard main body is mounted; a peripheral-device common connector (hereinbelow referred to as a "USB connector") connected to the control circuit board; and a conductive plate covering the control circuit board from a lower position.

Further, it is preferable that in the keyboard device having the conductive plate, the conductive plate is electrically connected to a ground terminal on the USB connector side on the control circuit board, and is electrically connected to a ground terminal on the computer main body side on the control circuit board. Otherwise, if the conductive plate cannot be directly connected to the ground terminals without difficulty for structural or other reasons, the conductive plate may be electrically connected around the ground terminal on the USB connector side on the control circuit board and electrically connected around the ground terminal on the computer main body side on the control circuit board.

The present inventor has paid attention to two factors of static noise entrance to the keyboard device, radiation from a surface of a desk, platform or the like on which the device is placed, and electrical conduction from the USB connector for connection with peripheral devices such as a mouse. In the keyboard device of the present invention, as the conductive plate provided to cover the control circuit board from a lower position functions as a shield plate, the static noise radiated from the surface of the desk can be shielded by the conductive plate. As a result, the probability of occurrence of operation failure due to static noise adversely effecting signals on the control circuit board can be sufficiently reduced.

Further, in a case where the conductive plate is electrically connected to the ground terminal on the USB connector side on the control circuit board and the ground terminal on the computer main body side on the control circuit board, respectively, as the conductive plate dissipates the static electricity, and the static electricity entered through the USB connector flows from the ground terminal on the USB connector side through the conductive plate, to the ground portion of the computer main body from the ground terminal on the computer main body side. That is, as the static electricity entered from the USB connector instantaneously passes through the conductive plate, the probability of occurrence of operation failure due to static noise adversely effecting signals on the control circuit board can be sufficiently reduced.

Note that generally, the control circuit board is constituted with a print circuit board, and wiring as an escape route for static electricity is formed so as to connect the ground terminal on the USB connector side to the ground terminal on the computer main body side, on the circuit board. Accordingly, even in a case where the conductive plate is connected to the control circuit board, static electricity flows not only through the conductive plate but also through the electrostatic conductive wiring on the control circuit board. However, since the impedance of the conductive plate is lower than that of the wiring, the amount of static electricity which flows through the conductive plate is far larger than that of static electricity which flows through the wiring. Accordingly, the keyboard device of the present invention having the conductive plate can obtain the above advantage.

Further, even if both ends of the conductive plate are not directly connected to the ground terminals on the USB connector side and the computer main body side, as long as they are electrically connected around the respective ground terminals, the conductive plate can function as an escape route for static electricity. Thus an advantage similar to that described above can be obtained.

In the keyboard device of the present invention, as a particular method for electrically connecting one end of the conductive plate to the ground terminal on the USB connector side, the one end of the conductive plate may be inserted between an arbitrary member such as a case and the USB connector, so that the end is pressed into contact with the ground terminal. Otherwise, the one end of the conductive plate may be soldered to the ground terminal itself of the USB connector or a land around the ground terminal on the control circuit board.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

[First Embodiment]

Figure 1:
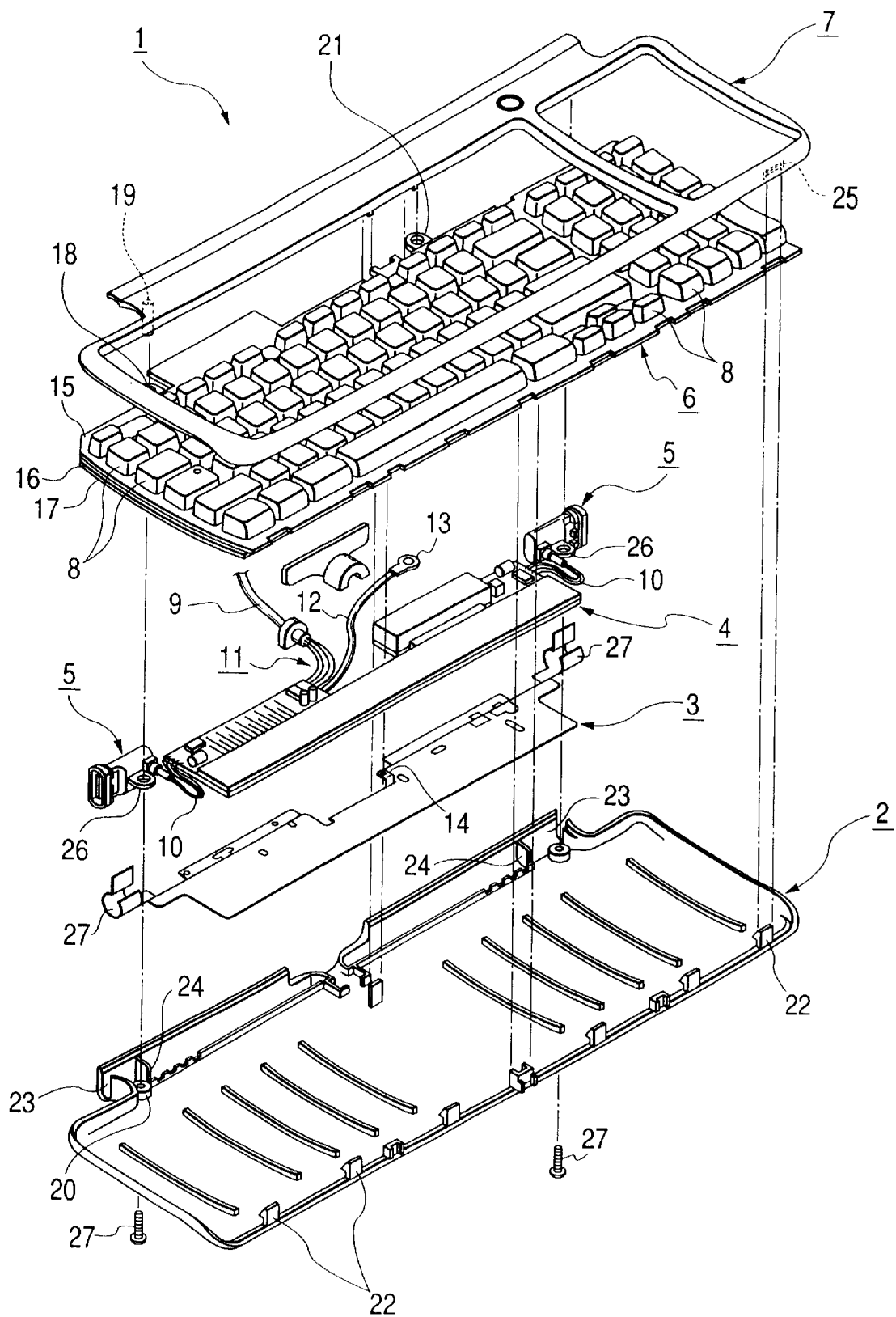
FIG. 1 is an exploded perspective view showing the structure of a keyboard device according to a first embodiment of the present invention.

Hereinbelow, a first embodiment of the present invention will be described with reference to FIGS. 1 and 2.

A keyboard device of the present embodiment has USB connectors connectable to peripheral devices such as a mouse in right and left end positions in the rear side (deep side) from a user. FIG. 1 is an exploded perspective view showing the keyboard device of the present embodiment, and FIG. 2 is a plan view showing a shield plate as a characteristic part of the present device.

In the figures, reference numeral 1 denotes the keyboard device; 2, a lower case; 3, a shield plate (conductive plate); 4, a control circuit board; 5, USB connectors; 6, a keyboard main body; and 7, an upper case.

As shown in FIG. 1, in the keyboard device 1 of the present embodiment, the keyboard main body 6 having a large number of key tops 8, and the control circuit board 4 on which a control circuit to control the keyboard main body 6 is mounted, are accommodated in the case. The case divides into the upper case 7 and the lower case 2. The keyboard main body 6 is accommodated in the case in a state where it is exposed from the upper case 7 such that the key tops 8 can be operated. Further, in a position below and rear of the keyboard main body 6, the control circuit board 4 connected to the two USB connectors 5 is accommodated.

The control circuit board 4 is formed with a general print circuit board. On the control circuit board 4, a cable 9 for connection with a personal computer main body is provided in an approximately central portion, and the USB connectors 5 connected via wiring 10 are provided in both end portions. The cable 9 is constituted with five conductors, i.e., two data lines, a power source line, a ground line and a shield line, soldered to a lower surface of the control circuit board 4. Further, for connection between the control circuit board 4 and the shield line, a conductor 12 is connected, and a personal-computer main-body side connection piece 14 and a connection member 13 at the end of the conductive line 12 to be described later are connected to each other.

Further, various electronic components such as an LSI and a capacitor are mounted on the lower surface side of the control circuit board 4, on the other hand, wiring of copper layer, lands and the like, connecting terminals of these electronic components and constituting the control circuit, are formed on the upper surface side. In the USB connector 5, a contact to be in contact with a plug is covered with soft PVC (polyvinyl chloride) resin, and a metal frame ground (not shown)(connector-side ground terminal) is fixed on an outer surface of the resin.

The keyboard main body 6 has a housing 15 to which plural key tops 8 are attached, and a metal plate 17. A membrane switch 16, formed of two membrane sheets on which switch circuits are printed and a spacer, is held between the metal plate 17 and the housing 15. Further, the metal plate 17 has two connection members 18 to fix the keyboard main body 6 between the upper case 7 and the lower case 2. The connection members 18 have through holes in positions corresponding to through connection members 19 of the upper case 7 and fastening members 20 of the lower case 2 to be described later. Further, a connection member 21, having a through hole for connection with the personal-computer main-body side connection piece 14 of the shield plate 3 to be described later, is provided in an approximately central portion in the metal plate 17.

In the lower case 2, provided are plural fixing members 22 provided on the front edge side to fix the upper case 7, connector grooves 23 provided on the rear edge side to define fixing positions of the connectors 5, stoppers 24 provided on the rear edge side around the connector grooves 23 to define fixing positions of the USB connectors 5, and the fastening members 20, projecting around the stoppers 24 and the connector grooves 23, in contact with the through connection members 19 to be described later from the upper case 7, to fix the upper case 7 and the lower case 2 to each other. When a connection plug of a mouse or the like is inserted into the USB connector 5, the stopper 24 receives the force of insertion, and acts as a rib to maintain the structural strength of the rear edge of the lower case 2.

The upper case 7 has plural hooks 25 which engage with the fixing members 22 of the lower case 2, and the through connection members 19. The through connection members 19 are in contact with the fastening members 20, via through holes of connection members 26 of the USB connectors 5 and through holes of the connection members 18 of the keyboard main body 6, and fastened by screws 29.

Figure 2:
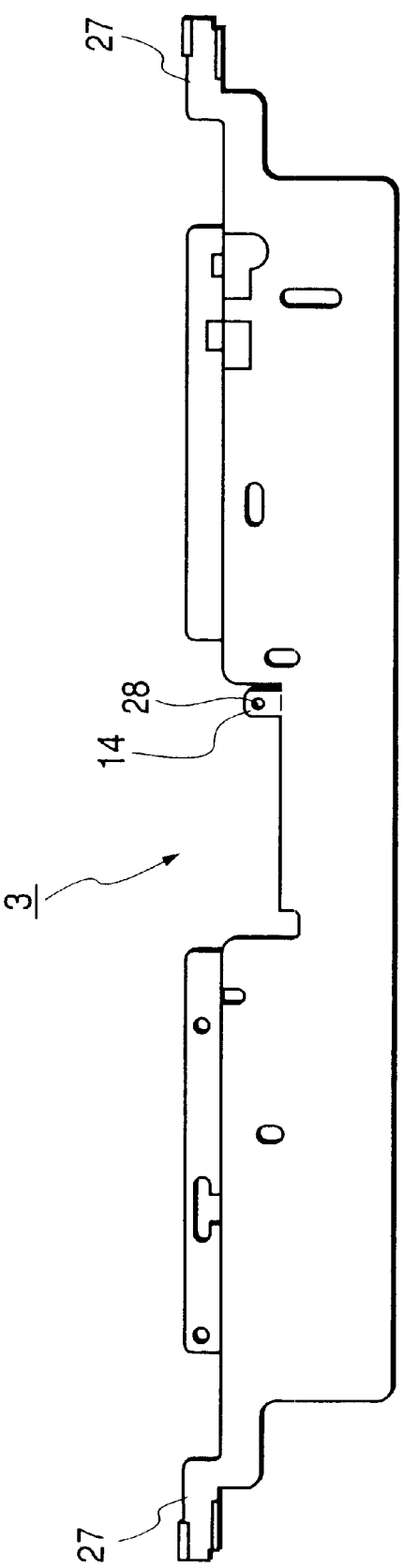
FIG. 2 is a plan view showing a shield plate used in the keyboard device.

As shown in FIG. 2, the shield plate 3 is formed with one sheet of stainless steel plate bend-processed to cover the various electronic components on the control circuit board 4. As the shield plate 3 is designed to have a shape and a size approximately corresponding to the control circuit board 4, it covers the entire control circuit board 4. Parts projected from both ends of the shield plate 3 are connector-side connection pieces 27 bent in a groove having the same shape of the connector groove 23. The USB connectors 5 are inserted into the connector-side connection pieces 27. In assembled state, the connector-side connection pieces 27 are held between the USB connectors 5 and the connector grooves 23 of the lower case 2, thus the connector-side connection pieces 27 are pressed in contact with frame ground members on the outer surface of the USB connectors 5.

Further, the personal-computer main-body side connection piece 14 having a rectangular shape, with a screw hole 28, is formed in an approximately central portion of the shield plate 3. Accordingly, in assembled state, the respective through holes of the personal-computer main-body side connection piece 14, the connection member 13 of the conductor 12, and the connection member 21 of the metal plate 17 are aligned with each other, and these members are screw-fixed to each other. Thus the shield plate 3 is connected via the conductive line 12 to the shield line of the cable 9 to the personal computer main body, i.e., the ground conductor of the personal computer main body.

When the keyboard device 1 having the above construction is assembled, as shown in FIG. 1, the USB connectors 5 connected to the control circuit board 4, with their connection members 26 in contact with the fastening members 20 of the lower case 2, are inserted into positions defined by the connector grooves 23, the stoppers 24 and the fastening members 20 of the lower case 2. At this time, the shield plate 3 is set under the control circuit board 4, and in a state where the connector-side connection pieces 27 of the shield plate 3 are inserted into the connector grooves 23 of the lower case 2, further, the USB connectors 5 are inserted into grooves formed by the connector-side connection pieces 27. The keyboard main body 6 is placed on the lower case in a state where the connection members 18 of the metal plate 17 are in contact with the connection members 26 of the USB connectors 5. Then, as described above, the personal-computer main-body side connection piece 14 of the shield plate 3, the connection member 13 of the conductor 12 and the connection member 21 of the metal plate 17 are aligned with each other, and these members are screw-fixed to each other. From an upper side of the keyboard main body, the hook members 25 of the upper case 7 are engaged with the fixing members 22 of the lower case 2, and the through connection members 19 of the upper case 7 are inserted through the connection members 18 of the metal plate 17 and the connection members 26 of the USB connectors 5, to be in contact with the fastening members 20 of the lower case 2, and fastened by the screws 29 from the bottom side of the lower case 2. Thus the upper case 7 and the lower case 2 are fixed to each other. In the keyboard device 1 of the present embodiment, as the control circuit board 4 is covered with the shield plate 3 from the lower position, static noise radiated from a desk or the like on the bottom surface side of the device is shielded by the shield plate 3. Further, as the connector-side connection pieces 27 of the shield plate 3 are connected to the frame ground members of the USB connectors 5, and the personal-computer main-body side connection piece 14 is connected to the shield line as the ground conductor of the personal computer main body, respectively, the shield plate 3 also functions as an escape route for static noise. Thus the static electricity entered from the USB connectors 5 can be dissipated from the shield plate 3 to the ground position of the personal computer main body. In this manner, as the shield plate 3 serves as an static electricity shield and a static electricity escape route, the probability of occurrence of operation failure due to static noise adversely effecting signals on the control circuit board 4 can be sufficiently reduced.

A electrostatic withstand voltage test (ESD test) has been performed in accordance with a method defined in international standards using a conventional keyboard without shield plate and the keyboard device of the present invention with shield plate. It has found that in comparison with a standardized value 8 kV as in an information processing device (note that this value is a standardized value in Europe, and such value is not standardized in Japan), the value of the conventional keyboard device is merely 6 kV, while that of the keyboard device of the present invention is 9 kV, i.e., the static noise resistance is improved. Thus, according to the keyboard device of the present invention, inconveniences such as malfunctions of peripheral devices and operation failure due to static noise can be prevented by simply adding a shield plate, and a keyboard device having a high operating reliability can be realized.

[Second Embodiment]

Hereinbelow, a second embodiment of the present invention will be described with reference to FIG. 3.

The difference between the present embodiment and the first embodiment is a connection status of the shield plate to the control circuit board. Accordingly, in the present embodiment, only the connection will be described and the explanation of the entire keyboard device will be omitted.

Figure 3:
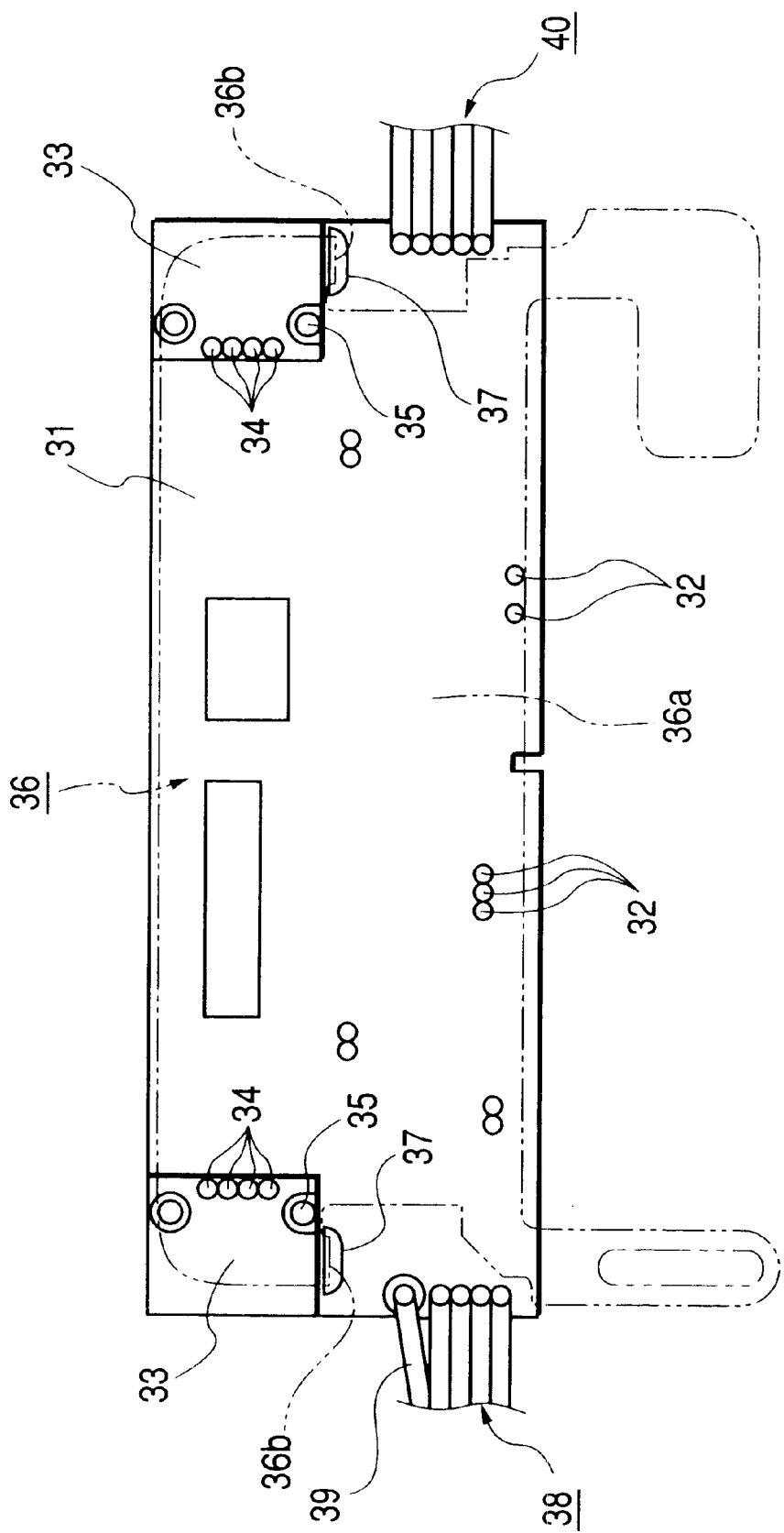
FIG. 3 is a plan view of a second embodiment of the present invention, showing a connection structure of the shield plate to the control circuit board.

FIG. 3 is a plan view of a control circuit board 31 on which the various electronic components such as an LSI and a capacitor (not shown) are mounted, showing the surface where the electronic components are not mounted. In this figure, on the upper surface side (the surface on which the electronic components are not mounted), lands 32 for solder connection between a wiring pattern (not shown) and the various electronic components are formed. Then, USB connectors 33 are respectively attached to right and left ends on the lower surface side of the control circuit board 31. In the first embodiment shown in FIG. 1, the USB connectors 5 are movably connected to the control circuit board 4 via the wiring 10, while in the present embodiment, the USB connectors 33 are completely fixed by solder connection of terminals 34 on the control circuit board 31. The terminals 34 of the USB connectors 33 include data line terminals, power-source line terminals and the like. Especially, the terminals denoted by numerals 35 in FIG. 3 are frame ground terminals (connector-side ground terminal).

A shield plate 36 is arranged to approximately cover the lower surface of the control circuit board 31, i.e., the surface on which the various electronic components are mounted. The shield plate 36 is formed with, e.g., a sheet of tin plate. The shield plate 36 has a shield part 36a extending parallel to the control circuit board 31 to cover the substrate, and connection parts 36b bent vertically-upward from the surface of the shield part 36a. Further, the ends of the connection parts 36b are inserted through holes formed in the substrate 31 and soldered on lands 37 on the substrate upper surface side. That is, the portions denoted by numerals 37 in FIG. 3 are positions in which the shield plate 36 is soldered to the control circuit board 31.

Further, on one end of the control circuit board 31, a cable 38 for connection with the personal computer main body is provided. The cable 38 is constituted with five conductors, i.e., two data lines, a power source line, a ground line and a shield line, soldered to the control circuit board 31. Especially, the conductor denoted by numeral 39 in FIG. 3 is the shield line. Note that a cable 40 connected to an LED substrate is connected to the other end of the control circuit board 31.

In the present embodiment, as in the case of the first embodiment, as the control circuit board 31 is covered with the shield plate 36 from a lower position, static noise radiated from the device lower-surface side can be shielded by the shield plate 36. On the other hand, different from the first embodiment, the shield plate 36 is not connected to the frame ground terminals 35 of the USB connectors 33 and the shield line 39 of the connection cable 38 for connection to the personal computer main body. However, as connection positions 37 of the shield plate 36 to the control circuit board 31 are sufficiently close to connection positions of the frame ground terminals 35 and the shield line 39, static electricity entered from the USB connectors 33 can be dissipated to the shield line 39 of the cable 38 through the shield plate 36. As a result, the present embodiment has a similar advantage that of the first embodiment that the probability of occurrence of operation failure due to static noise adversely effecting signals on the control circuit board can be sufficiently reduced.

In this manner, in the present embodiment, even though the shield plate 36 is not connected to the frame ground terminals 35 and the shield line 39, the shield plate 36 can function as an escape route for static electricity if the connection positions of these members are close to each other. To ensure this function, it may be arranged such that these members are directly connected to each other by wiring formed on the control circuit board 31.

Note that the technical scope of the present invention is not limited to the above embodiments, but various changes can be made without departing from the subject matter the present invention. For example, in the above embodiments, lightweight and high-strength stainless steel and tin plates are employed as materials of the shield plate, however, phosphor bronze and the like can be also used. Further, in design of the shield plate, particular shape and size and the like can arbitrarily changed.

As described above, according to the present invention, inconveniences such as malfunctions of peripheral devices and operation failure due to static noise can be prevented by simply adding a shield plate, and a keyboard device having a high operating reliability can be realized.

As many apparently widely different embodiments of the present invention can be made without departing from the spirit and scope thereof, it is to be understood that the invention is not limited to the specific embodiments thereof except as defined in the appended claims.

What is claimed is:

1. A keyboard device comprising:

a keyboard main body having plural key tops on an upper surface;

a case accommodating the keyboard main body;

a control circuit board on which a control circuit that controls the keyboard main body is mounted;

a peripheral-device common connector connected to the control circuit board; and a conductive plate covering the control circuit board from a lower position, wherein the conductive plate is electrically connected to one of a first ground terminal directly and around the first ground terminal, the first ground terminal on the side of the peripheral-device common connector on the control circuit board, and electrically connected to one of a second ground terminal directly and around the second ground terminal, the second ground terminal on the side of a computer main body on the control circuit board.

2. The keyboard device according to claim 1, wherein a part of the conductive plate is pressed into contact with the peripheral-device common connector and is electrically connected too the first ground terminal on the side of the peripheral-device common connector.

3. The keyboard device according to claim 1, wherein a part of the conductive plate is soldered to one of the first ground terminal of the peripheral-device common connector and onto the control circuit board around the first ground terminal, and is electrically connected to one of the first ground terminal directly and around the first ground terminal.

* * * * *

UNITED STATES PATENT AND TRADEMARK OFFICE
CERTIFICATE OF CORRECTION

PATENT NO. : 6,597,343 B1
DATED : July 22, 2003
INVENTOR(S) : Naoya Akiyama et al.

It is certified that error appears in the above-identified patent and that said Letters Patent is hereby corrected as shown below:

<u>Column 8,</u>
Line 38, delete "too" and substitute -- to -- in its place.

Signed and Sealed this

Eleventh Day of November, 2003

JAMES E. ROGAN
*Director of the United States Patent and Trademark Office*